United States Patent [19]
Lövgren et al.

[11] Patent Number: 4,755,306
[45] Date of Patent: Jul. 5, 1988

[54] METHOD FOR COLLECTING A HIGHLY VISCOUS, TOUGH AND TACKY MATERIAL FROM AN AREA COVERED BY SUCH MATERIAL

[75] Inventors: Gert A. Lövgren, Bjärred; Karl T. Haugen, Veberöd, both of Sweden

[73] Assignee: Disab International AB, Dalby, Sweden

[21] Appl. No.: 936,642

[22] Filed: Nov. 26, 1986

Related U.S. Application Data

[63] Continuation of Ser. No. 607,394, May 2, 1984, abandoned.

[30] Foreign Application Priority Data

May 5, 1983 [SE] Sweden .................. 83025676

[51] Int. Cl.$^4$ ............................ C02F 1/40; B08B 7/00
[52] U.S. Cl. .................................. 210/773; 134/19; 134/21; 134/25.1; 134/40; 210/774; 210/925
[58] Field of Search ............... 134/19, 21, 40, 25.1; 210/767, 772–774, 776, 925

[56] References Cited

U.S. PATENT DOCUMENTS

| | | | |
|---|---|---|---|
| 3,964,925 | 6/1976 | Burgoon | 134/21 |
| 4,424,081 | 1/1984 | Giguere | 134/25.1 |
| 4,492,001 | 1/1985 | Hedrenius | 134/21 |

*Primary Examiner*—Ivars Cintins
*Attorney, Agent, or Firm*—Lowe, Price, LeBlanc, Becker & Shur

[57] ABSTRACT

A method for collecting from a surface area crude oil or a similar highly viscous, tough and tacky material which covers the surface area as a layer, is characterized by consecutively separating volumes of the layer by means of a curtain of a fluid which under pressure is driven into the layer and has been heated to a temperature capable of lowering the high viscosity of the material in the volume, and applying suction to the material in the volume thus made low-viscous, for removing this volume of material from the area.

A suction nozzle for carrying out this method has a suction channel which is connectible to a suction conduit, a pressure fluid chamber which has pressure fluid inlets and a first pressure fluid outlet surrounding the intake end of the suction channel.

9 Claims, 2 Drawing Sheets

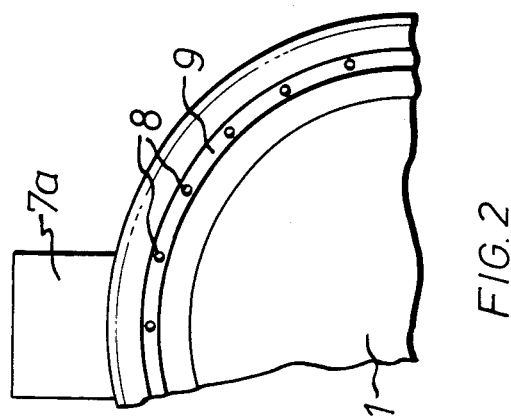
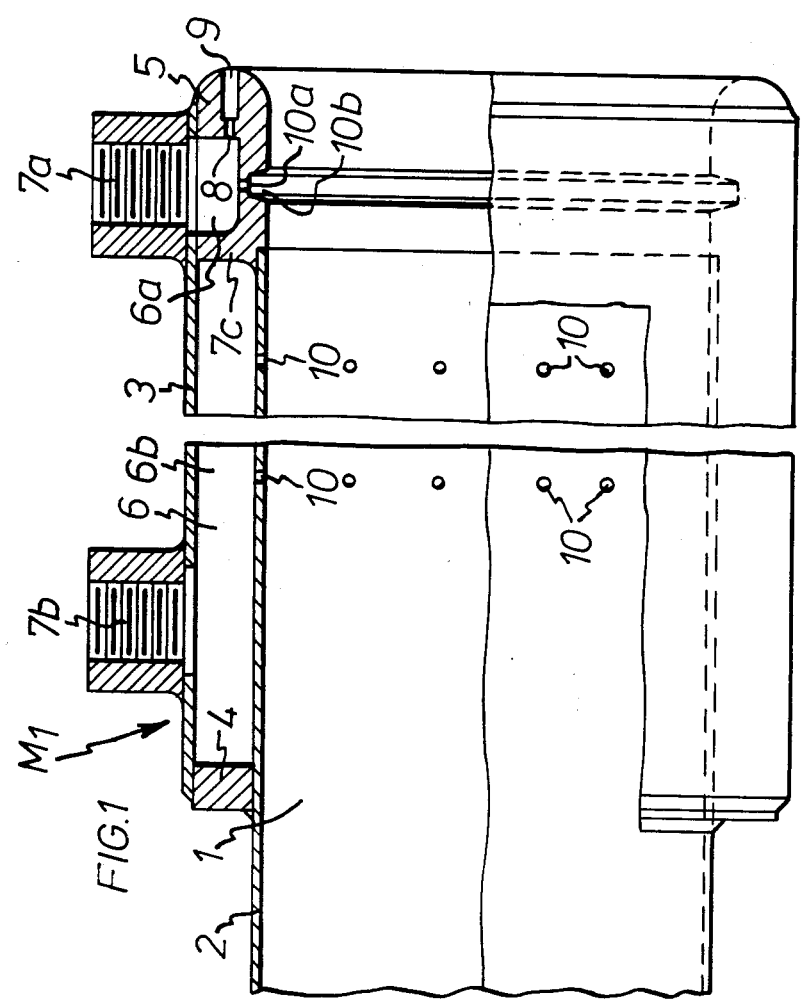

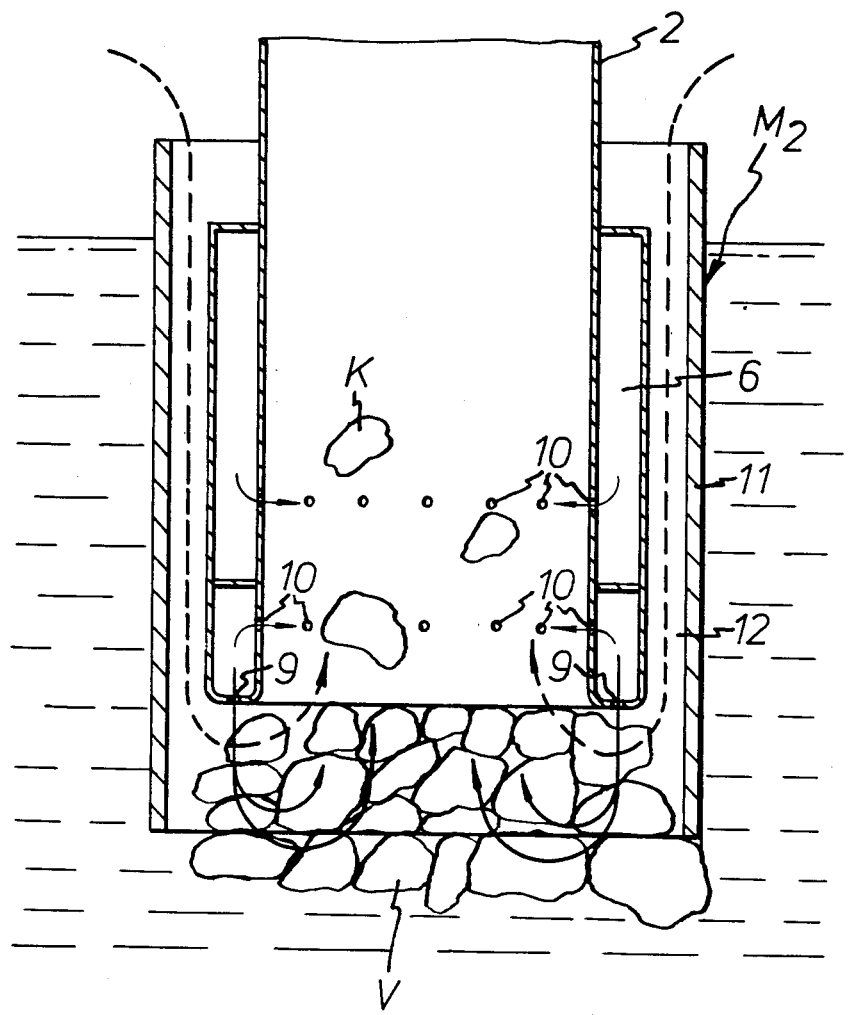

METHOD FOR COLLECTING A HIGHLY VISCOUS, TOUGH AND TACKY MATERIAL FROM AN AREA COVERED BY SUCH MATERIAL

This application is a continuation of application Ser. No. 607,394, filed May 2, 1984 now abandoned.

The present invention relates to a method for collecting a highly viscous, tough and tacky material from an area covered by such a material.

The destruction caused by crude oil pollution at sea and on land is a recurrent problem which has found a great many more or less inefficient solutions, such as the use of chemical destruction compounds, dragnets, mechanical whips. As is well known, a major difficulty in crude oil destruction is caused by the highly viscous, tough and tacky nature of the crude oil, which makes it difficult to collect and transport, as well as the inflammability of this type of oil.

The object of the invention is to provide a relatively uncomplicated method and a relatively uncomplicated device for the efficient destruction of crude oil pollution and, more particularly, to provide a method and a device for collecting highly viscous, tacky and tough material from an area which is covered by such material as a layer.

According to the invention, this object is achieved by a method comprising the steps of consecutively separating volumes of said layer by means of a curtain of a fluid which under pressure is driven into the layer and which has been heated to a temperature capable of lowering the high viscosity of the material in said volume, and applying suction to the material in said volume thus made low-viscous, for removing said volume of material from said area.

A nozzle for carrying out the method has a pressure fluid chamber which has pressure fluid inlets and a first pressure fluid outlet surrounding the intake end of the suction channel.

Briefly, the invention proposes heating, in a non-inflammable, manner, volumes within the area of the material to be collected with a view to lowering the viscosity of the material to a level which allows sucking thereof, while at the same time sucking off said volumes from the area. Especially in crude oil destruction, this combination of heating and sucking confers a substantial advantage in that the crude oil constituents separated by the heating will not have time to escape into the atmosphere or down into e.g. an underlying earth layer to pollute the atmosphere and the earth layer, but these constituents will be immediately sucked off and removed from the area.

The invention is applicable not only to oil destruction and withdrawal of oil e.g. from an oil store, but also to the collection of other tough, highly viscous materials, such as bituminous products, clay etc., from different areas or stores.

The invention will be described in greater detail hereinbelow with reference to the accompanying drawings, in which:

FIG. 1 is a part sectional view of a nozzle according to the invention;

FIG. 2 is a partial front view of the same nozzle; and

FIG. 3 is a sectional view of an alternative nozzle embodiment in operation.

The nozzle M1 in FIG. 1 has a circular suction channel 1 which has a conventional coupling portion 2 (not shown in greater detail) to be sealingly connected to a suction hose whose other end is connected to a suction source, such as a Roots blower.

A casing 3 is concentrically mounted on the outer face of the suction channel 1 in a radially spaced relationship thereto and defines, together with rear and forward transverse and circumferential end walls 4, 5 and the outer side of the suction channel, a pressure chamber 6, which preferably, and as illustrated, is divided into a forward compartment 6a and a rear compartment 6b which are separated from each other by a transverse, circumferential partition 7c. The suction channel 1 and the casing 3 are made of metal and assembled by welding.

The casing 3 is provided with inlets 7a, 7b to a respective compartment 6a, 6b. The inlets 7a, 7b are connected, in a manner not shown in more detail, to a source of hot pressure fluid, optionally via a respective pressure control means to provide for different pressures in the compartments 6a, 6b of the pressure chamber 6.

In the forward end wall 5 of the pressure chamber 6, there are provided bores 8 equidistantly distributed along the circumference and extending from the side of the end wall 5 which faces the chamber, a certain distance forwards to a location where they widen to form a common annular plenum chamber 9 which extends through the remaining portion of the end wall thickness. The passage 8, 9 extends substantially straight forwards. In the circumferential wall of the suction channel 1, there are provided bores 10 of which a forward set of circumferentially equidistantly distributed bores 10a preferably widen towards the interior of the suction channel to form a common annular plenum chamber 10b.

The function of the nozzle is as follows. The nozzle is introduced with its forward end e.g. into the layer of a crude oil pollution which covers an area at sea or on land. The connection from the source of hot pressure fluid, preferably pressurized steam, to the chamber compartments 6a, 6b is opened so that steam will flow into the compartments 6a, 6b of the pressure chamber 6. The steam is driven under pressure from the forward compartment 6a through the bores 8 and the plenum chamber 9 and into the layer of crude oil, in the form of an annular curtain which encloses a volume of the oil in front of the nozzle. With the connection between the suction source and the suction channel 1 already opened or now being opened, the steam curtain will be deflected towards the mouth of the suction channel 1 and will heat the enclosed oil volume while lowering the viscosity thereof and tearing off this oil volume. The oil is thereafter sucked into the suction channel 1 in the form of disintegrated, more buoyant lumps and will encounter the steam jets ejected through the bores 10 so as to be further heated and disintegrated. Because of its more buoyant state which is also increased by the heat transmitted from the pressure chamber 6 through the wall of the suction channel 1 and because of the influence of the force from said steam jets, these lumps will have but a slight tendency to adhere to the inner wall of the suction channel and are readily sucked through the suction channel 1.

In FIG. 3, there is shown a modified embodiment, in operation, of the nozzle now described. This embodiment may advantageously be used for sucking operations at greater depths in the layer of material to be collected, e.g. the crude oil layer. The nozzle M2, in addition to a nozzle element M1 of the same design as shown in FIGS. 1 and 2, comprises a concentrically mounted casing 11 which is radially spaced from the casing 3 and whose forward end extends a certain distance beyond the forward or inlet end of the nozzle element M1. The gap 12 between the outer wall of the casing 3 and the wall of the casing 11 serves as a passage for compensating air from the ambient atmosphere, which on its way towards the mouth of the suction channel 1 also assists in tearing off the crude oil volume enclosed by the steam curtain. In FIG. 3, the general flow pattern of the steam is indicated by full arrows and that of the compensating air by broken arrows. The oil volume enclosed by the steam curtain is designated V and the broken-away lumps of oil K.

The oil polluted area is searched through by the nozzle until the pollution has been substantially removed from the area. If the fluid volumes of oil pollution which are discharged through the rear or outlet end of the nozzle should be conveyed over long distances, e.g. to a collecting tank, the suction hose downstream of the coupling 2 is provided with heating means or an inlet for a suitable viscosity-lowering agent so as to maintain the pollutant in a fluid, suckable state on its way to the place of deposition.

What we claim and desire to secure by Letters Patent is:

1. A method for collecting and removing from one of a water surface area or from substantially atop an underlying earth layer surface area a material consisting of at least one of a crude oil, bituminous products or clay which covers said surface area as a tacky layer, comprising the steps of consecutively separating volumes of said tacky layer by means of a fluid curtain driven under pressure into the tacky layer and which fluid curtain has been heated to a temperature capable of lowering the high viscosity of the tacky material in said volume, said fluid curtain surrounding to substantially entirely enclose a predetermined area of said tacky layer; and applying suction to the volume of tacky material in said surrounded predtermined area thus made low-viscous, for removing said volume of tacky material from said area.

2. Method as claimed in claim 1, comprising the further step of injecting circumferentially around said fluid curtain and in the same direction a flow of ambient atmospheric air assisting in the break up of said volume of material within said area from said layer.

3. Method as claimed in claim 1, wherein said volume of material is suctioned from said layer along a flow path coaxially within said fluid curtain, and comprising the further step of injecting hot fluid from the curtain into the flow path at a number of locations spaced apart in the longitudinal direction of said flow path.

4. Method as claimed in claim 1, wherein said hot fluid is water vapour.

5. The method of claim 1, wherein said fluid curtain is essentially in the form of a generally annular curtain.

6. The method of claim 1, wherein suction is applied to draw material forming said tacky layer through a center suction passage located concentrically within the fluid curtain.

7. The method of claim 6, wherein material sucked through said suction passage extending concentrically within the fluid curtain consists substantially entirely of disintegrated lumps of material forming said tacky layer and fluid from said fluid curtain.

8. The method of claim 1, wherein said fluid curtain and suction are applied to the tacky layer through a nozzle by introducing a forward end of the nozzle into the tacky layer.

9. The method of claim 8, wherein said fluid curtain is steam.

* * * * *